(12) United States Patent
Marla et al.

(10) Patent No.: US 7,487,697 B2
(45) Date of Patent: Feb. 10, 2009

(54) POWER TRANSFER UNIT

(75) Inventors: Durgaprasad Marla, Inkster, MI (US);
Jonathan Adler, Ann Arbor, MI (US);
Dennis Cook, Royal Oak, MI (US);
Gary Monkaba, Troy, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 397 days.

(21) Appl. No.: 11/522,013

(22) Filed: Sep. 15, 2006

(65) Prior Publication Data

US 2007/0006675 A1 Jan. 11, 2007

Related U.S. Application Data

(63) Continuation-in-part of application No. 10/444,032, filed on May 22, 2003, now Pat. No. 7,127,967.

(51) Int. Cl.
*F16H 37/06* (2006.01)
(52) U.S. Cl. .................. 74/665 GC; 74/413; 74/420; 74/665 H
(58) Field of Classification Search .................. 74/413, 74/417, 420, 665 GA, 665 GC, 665 H
See application file for complete search history.

(56) References Cited

U.S. PATENT DOCUMENTS

| | | | |
|---|---|---|---|
| 1,830,810 A | 11/1931 | Russell | |
| 2,392,313 A | 1/1946 | Dahlstrand | |
| 4,223,570 A | 9/1980 | Yamamori et al. | |
| 4,428,452 A * | 1/1984 | Muraoka et al. | 180/249 |
| 4,441,575 A * | 4/1984 | Suzuki | 180/248 |
| 5,071,396 A * | 12/1991 | Kobayashi | 475/249 |
| 5,205,373 A | 4/1993 | Kadokura et al. | |
| 5,222,573 A | 6/1993 | Kameda et al. | |
| 5,515,940 A | 5/1996 | Shichinohe et al. | |
| 5,609,072 A | 3/1997 | Lequis et al. | |
| 6,001,043 A * | 12/1999 | Yun | 475/221 |
| 6,076,623 A * | 6/2000 | Teraoka et al. | 180/233 |
| 6,605,018 B2 * | 8/2003 | Palazzolo | 475/222 |
| 6,763,736 B2 | 7/2004 | Hori et al. | |
| 2003/0040395 A1 | 2/2003 | Palazzolo | |
| 2004/0235605 A1 | 11/2004 | Cook et al. | |

FOREIGN PATENT DOCUMENTS

| | | |
|---|---|---|
| DE | 19811874 | 11/1998 |
| EP | 0279889 | 4/1987 |
| JP | 09-216524 | 8/1997 |

* cited by examiner

*Primary Examiner*—Ha D. Ho (57) ABSTRACT

A motor vehicle power transfer unit for distributing torque from a transmission assembly between a front wheel drive line and a rear wheel drive line, the power transfer unit includes a housing, non-parallel gear set located in the housing and including a ring gear, and a parallel gear set including an idler, and an idler shaft secured to and supported on the housing. The idler shaft, which extends through the idler gear and supports the idler gear for rotation, includes an interior chamber, an outer surface, and a wall. A portion of the outer surface is formed with a clearance space, into which space a portion of the ring gear extends and rotates. The clearance space communicates through the wall to the chamber, the wall being formed with a hydraulic passage, which carries lubricant from the chamber to the outer surface.

19 Claims, 6 Drawing Sheets

POWER TRANSFER UNIT

CROSS-REFERENCE TO RELATED APPLICATION

This application is a continuation-in-part of the U.S. patent application Ser. No. 10/444,032, filed May 22, 2003 now U.S. Pat. No. 7,127,967.

BACKGROUND OF THE INVENTION

1. Field of the Invention

The present invention relates to the power train of a motor vehicle. More specifically, the present invention relates to a power transfer unit for distributing power to the wheels of the vehicle.

2. Description of the Prior Art

Most automobiles in the United States have typically utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion of new automobiles are front wheel drive based vehicles. In a front wheel drive vehicle, typically both the engine and the transmission assembly are transversely oriented in the vehicle. By positioning the power plant and transmission assembly transversely, more direct coupling of the transmission assembly to the vehicle's transaxle and front wheels can be achieved.

With front wheel drive vehicles themselves becoming a mature market, a recent trend in the automobile industry has been to adapt front wheel drive schemes into all-wheel-drive or four-wheel-drive applications. This is accomplished by providing a power transfer unit that diverts a portion of the power from the front wheels to a rear wheel drive shaft and, subsequently, the rear wheels.

As a way of maximizing manufacturing resources, it is desirable to develop automotive products that can be utilized and incorporated across a variety of platforms. When incorporated into a vehicle, the power transfer unit is attached to the output face of the vehicle transmission. It is therefore in close proximity to the engine, the transmission, the steering rack and the exhaust manifold.

Additionally, new PZEV catalytic converters are required to be located closer to the exhaust manifold so that they can achieve a quicker "light-off" of the catalyst. These PZEV catalytic converters also tend to be larger and generate higher temperatures than previous non-PZEV catalytic converters. The proximity to the engine, transmission and the other under hood components accordingly limits the size of the power transfer unit. Further, the high temperature of "manicat" catalytic converters and the previously mentioned PZEV catalytic converters means that polymer based products, such as lubricants and seals, need to be placed at as great a distance as possible from the PZEV catalytic converter.

One manner in which the overall size of the power transfer unit can be reduced is to similarly reduce the size of the gears, bearings and shafts of the power transfer unit itself. However, reducing the size of these components limits their overall torque carrying capacity.

An end result of all of the above is a desire for lateral compactness in the design of the power transfer unit. By compacting this lateral size of the power transfer unit, the power transfer unit can be configured as multiplatform assembly, in that the system itself can be designed for the worst case scenario, in other words the minimum lateral width available for a power transfer unit.

In order to achieve the greatest lateral compactness possible, the gears and bearings located inside the power transfer unit need to be located in the most space efficient manner possible. This can result in conflicts in the sizing and shaping of various components of the unit.

For example, in a three axis power transfer unit, a conflict can exist between the sizing of a hypoid ring gear and clearance between that ring gear and the support shaft of an idler gear. As used herein, the term "three axis power transfer unit" is one in which a driving gear, an idler gear and a driven gear, all located on parallel axes, are utilized in the power transfer unit. Because of the size of the ring gear typically required in power transfer units and because of the size of the bearings required to support the shaft upon which the idler gear is mounted, the ring gear and the idler gear bearing support are too large and located too longitudinally close together to enable these components to be mounted in a common plane. These components are, therefore, staggered laterally, forcing the power transfer unit to be wider than it might otherwise be. Even then, the size of the ring gear encroaches on the idler gear support shaft thereby limiting the size of that shaft. Clearly, merely reducing the cross-sectional diameter of the idler gear support shaft would result in reduced strength in the shaft and thereby limiting the size and capacity of the shaft, as well as the supporting bearing.

As seen from the above, there exists a need for increasing the lateral compactness of a power transfer unit so as to minimize its occupation of space in the engine bay and beneath the body of the vehicle and additionally to provide for a power transfer unit which exhibits multiplatform characteristics.

It is also and object of this invention to provide novel constructions for supporting an idler gear in situations where the ring gear positioning would be in conflict with the idler gear support, without increasing the lateral compactness of the power transfer unit.

SUMMARY

A motor vehicle power transfer unit (PTU) for distributing torque from a transmission assembly between a front wheel drive line and a rear wheel drive line, said power transfer unit includes a housing, non-parallel gear set located in the housing and including a ring gear, and a parallel gear set including an idler, and an idler shaft secured to and supported on the housing. The idler shaft, which extends through the idler gear and supports the idler gear for rotation, includes an interior chamber, an outer surface, and a wall. A portion of the outer surface is formed with a clearance space, into which space a portion of the ring gear extends and rotates. The clearance space communicates through the wall to the chamber, the wall being formed with a hydraulic passage, which carries lubricant from the chamber to the outer surface.

An opening in the idler shaft is located in the radial path of lubricant that is slung from the ring gear. Lubricant directed at this opening is collected within an interior chamber formed in the idler shaft and drains from the chamber into contact with support bearings carried on the idler shaft. It has been discovered that lubricant is delivered to those bearings even if the lubricant sump level is low.

In each embodiment the outer surface of the idler shaft has a constant outside diameter, which facilitates assembly and installation in the housing. In one embodiment the idler gear can be formed from tube stock at low cost and requires little machining.

The output of the transmission assembly is coupled to an input member and to a first gear wheel, the driving gear, in a parallel gear set. The driving gear transfers rotation through an idler gear to a driven gear. That driven gear is mounted on a shaft whose rotational axis is generally parallel to the rotational axis about which the driving gear rotates. On the end of this transfer shaft is mounted a first bevel gear or gear ring of the non-parallel gear set. The first bevel gear engages a second bevel gear, such as a hypoid pinion gear, mounted to or formed with a shaft; this shaft being oriented generally perpendicularly to the rotational axis of the ring gear. The opposing end of the shaft is the output of the power transfer unit.

The idler gear is rotatably supported on a non-rotating idler shafts that extends through the idler gear. In one embodiment, the non-rotating idler shaft is a boss extending from one side of the housing toward an opposing side of the housing. In another embodiment, the non-rotating idler shaft is a stationary shaft.

By providing the support for the idler gear through a non-rotating idler shaft, bearing supports for that idler shaft are eliminated. By eliminating these bearing supports, additional area within the power transfer unit is freed up so as to accommodate the ring gear of the non-parallel gear set in a more laterally compact construction. In other words, the ring gear of the non-parallel gear set need not be laterally staggered or spaced so as to avoid conflict with the bearing support for the idler gear.

Further objects, features and advantages of this invention will become readily apparent to persons skilled in the art after review of the following description, with reference to the drawings and the claims that are appended to and form a part of this specification.

DETAILED DESCRIPTION

Figure 1:
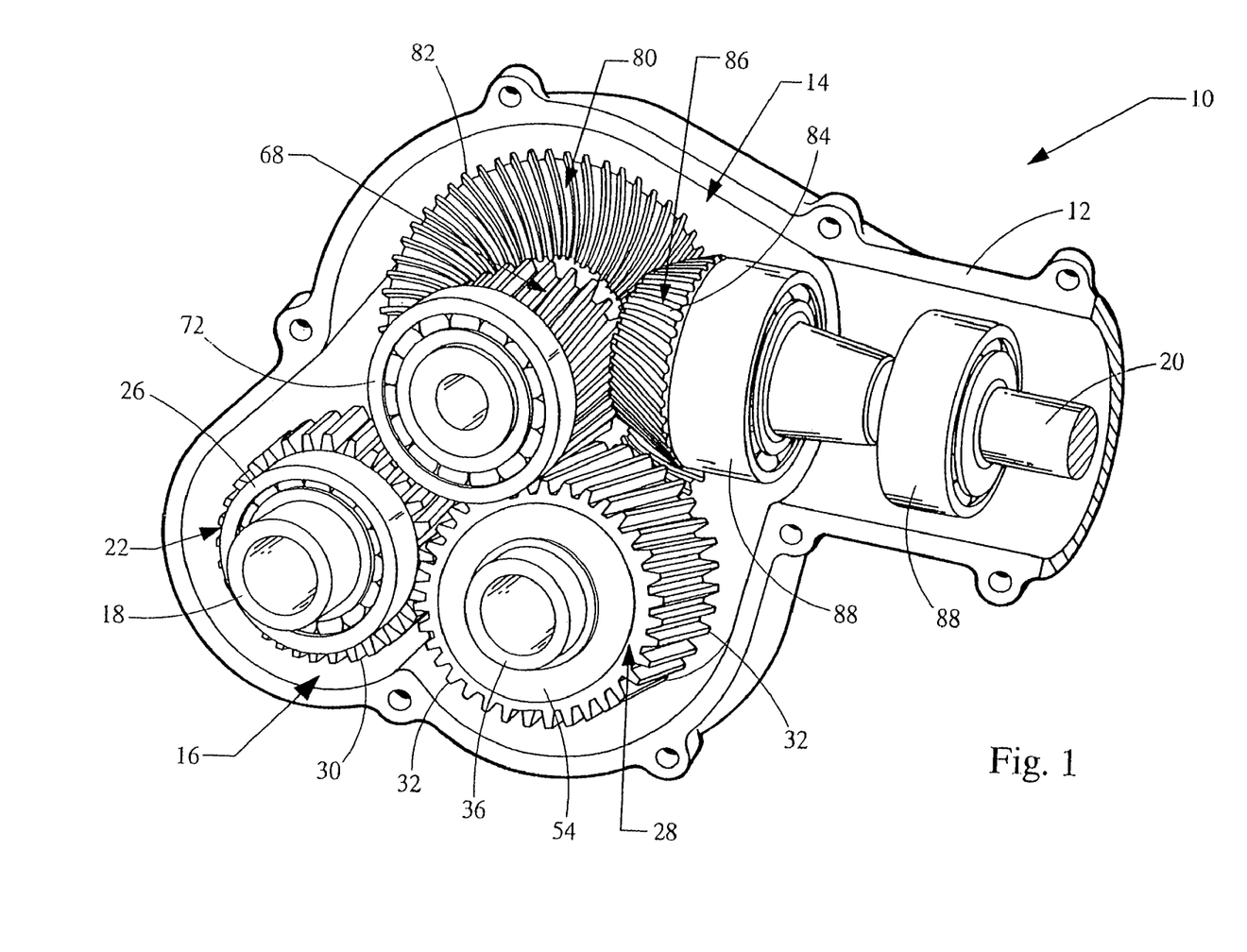
FIG. 1 is perspective view, with portions cut away, of a power transfer unit.

Referring now to the drawings, FIG. 1 illustrates a power transfer unit 10 incorporating the principles of the present invention. The power transfer unit 10 includes a housing 12 in which the primary components of the unit 10 are integrally packaged. These components principally include a non-parallel gear set 14 and a parallel gear set 16.

As used herein, the term "parallel gear set" is intended to refer to mechanisms with gear wheels that transfer power from a first shaft to a second shaft; the first and second shafts defining axes that are generally parallel to one another.

The term "non-parallel gear set", as used herein, is intended to refer to any mechanism, (including, without limitation, mechanisms with gear wheels, mechanisms without gear wheels, gear trains, chain gears and belt systems) for transferring power from a first shaft to a second shaft; wherein the first and second shafts define axes that are generally not parallel to one another.

As mentioned above, the primary components of the power transfer unit 10 are all integrally packaged together and provided within a common housing 12. Input and outputs 18, 20 of the unit 1 may or may not protrude from the housing 12 depending on the specific design criteria and the application in which the power transfer unit 10 is being employed.

Rotation from an output of a transmission assembly (not shown) is coupled to the input 18 (hereafter "driving shaft 18") of the power transfer unit 10, and in particular, of the parallel gear set 16. To facilitate engagement of the driving shaft 18 with the output of the transmission assembly, the end of the driving shaft 18 may be internally or externally splined as seen at 19.

The first gear wheel, driving gear 22, of the parallel gear set 16 is mounted to the driving shaft 18 by conventional means, such as unitarily forming the driving gear 22 with the driving shaft 18 (as illustrated) or welding the driving gear 22 to the driving shaft 18, so as to rotate with rotation of the driving shaft 18. This rotation thus occurs about an axis 24 defined by the driving shaft 18. To facilitate rotation of the driving shaft 18 and the driving gear 22, the driving shaft 18 is supported on bearings 26, one such kind being tapered bearings, supported by the housing 12.

Rotation from the driving gear 22 is transferred to an intermediate gear wheel, hereafter idler gear 28, by means of external teeth 30 on the driving gear 22 which intermesh with external teeth 32 on the idler gear 28. Preferably, the driving gear 22 and the idler gear 28 are helical gears so as to increase the torque transferring efficiency of the power transfer unit 10. Alternatively, however, the teeth 30, 32 could be formed straight. As the specific design criteria will dictate, the idler gear 28 may be larger, smaller or the same diameter as the driving gear 22.

Figure 2:
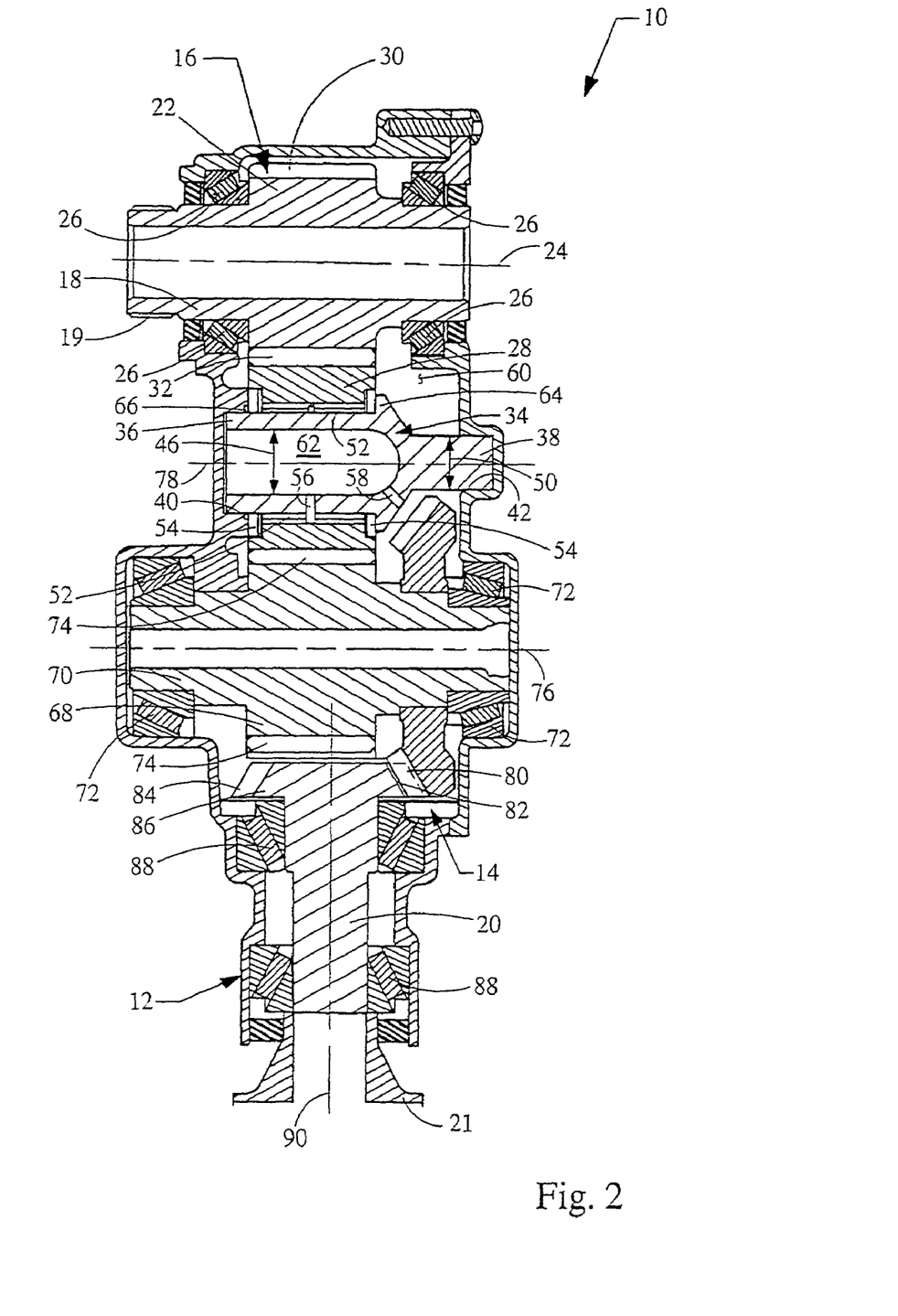
FIG. 2 is a cross section of a power transfer unit according to a first embodiment.

As seen in FIG. 2 in the first embodiment the idler gear 28 is rotatably supported on a stationary member extending through the idler gear 28. As illustrated in the embodiment of FIG. 2, the stationary member 34 is a stationary shaft "shaft 34"). The shaft 34 includes first and second ends 36, 38 that are respectively received within first and second seats 40, 42 defined in the housing 12. To prevent rotation of the shaft 34 relative to the housing 12, one or both of the first and second ends 36, 38 may be fixed by welding, keying, press-fitting or otherwise fixedly engaging the ends 36, 38 with the housing 12 at the seats 40, 42.

To enable enhanced lateral compactness of the power transfer unit 10, and as further described below, the shaft 34 is provided with a part defining a first diameter 46 and, a second part defining a second diameter 50, the second diameter 50 being less than the first diameter 46. The idler gear 28 is rotatably supported on the first part by radial bearings 52. Axially, the idler gear 28 is supported by axial idler shafts 54. Since the axial loads applied to the idler gear 28 tend to be modest, the axial members 54 may be needle thrust bearings or simple thrust washers. The radial loads handled by the radial bearings 52 can be large and, accordingly, the radial bearings 52 must be relatively wide. In this instance, a pair of radial needle bearings is used. Through the use of needle bearings as the radial bearings 52, their narrow radial dimension allows for the larger first diameter 46 of the first part. Utilization of radially thicker tapered roller bearings would require the diameter of the first part to be decreased resulting in a decrease in the strength of the stationary shaft 34. However, if a lower strength shaft were acceptable for a given design, tapered roller bearings could be utilized or, if reduced diameter tapered roller bearings were designed, they could be used.

In order to provide lubrication to the radial needle bearings 52, the stationary shaft 34 is provided with one or more lubrication ports 56, 58. The lubrication port 56 is located such that it delivers lubrication to annular space between the pair of radial needle bearings 52. Accordingly, the lubrication port 56 includes a discharge opening on the exterior surface of the first part of the stationary shaft 34. To provide lubricant to the lubrication port 56, another lubrication port 58 extends to the exterior surface of the shaft 34 at a location to entrain lubricant from the sump 60 of the power transfer unit 10. As seen in the figure, the inlet opening of the lubrication port 58 is located in the region transitioning from the first part to the second part. To further facilitate the transfer of lubricant, the first part of the stationary shaft 34 is provided with a hollow interior generally designated at 62. Accordingly, both lubrication ports 56, 58 extend from the exterior surface of the shaft 34 to the hollow interior 62. As will be readily appreciated, other locations for the ports may be employed.

In order to locate and retain the idler gear 28 on the first part of the stationary shaft 34, a shoulder 64 is formed on the stationary shaft 34 in the region transitioning from the first part to the second part and axial members 54 engage the shoulder 64. Axial movement of the idler gear 28 in the opposing direction is limited by appropriate portions of the housing 12. Initial retention of the idler gear 28 on the stationary shaft 34 may be achieved by a snap ring 66 received within an appropriately located groove in the first part of the stationary shaft 34.

From the idler gear 28, rotation is transferred to a third gear, driven gear 68, of the parallel gear set 16. The driven gear 68 is supported by a driven shaft 70 which is in turn rotatably supported on bearings 72 within the housing 12. The driven gear 68 may be fixed to the driven shaft 70 in a conventional manner, including unitarily forming the driven gear 68 with the driven shaft 70 (as illustrated) or welding the driven gear 68 thereto. To facilitate the transfer of rotation from the idler gear 28 to the driven gear 68, external teeth 74 on the driven gear 68 engage the teeth 32 of the idler gear 28.

Provided in the above described manner, the driven shaft 70 defines the third axis 76 of the parallel gear set; the second axis 78 being defined by the stationary shaft 34 and about which the idler gear 28 rotates. The power transfer unit 10 is therefore known as a three axis unit.

In order to transfer rotation from the parallel gear set 16 to the non-parallel gear set 14, a first bevel gear, ring gear 80, of the non-parallel gear set 14 is mounted to the driven shaft 70. Often, the location and diameter of the ring gear 80 is such that the ring gear 80 would typically encroach upon the support shaft of an idler gear. For this reason, ring gears have conventionally been laterally spaced on the driven shaft so as to be staggered from the idler gear support. This in turn forces the power transfer unit to be wider than if the encroachment did not occur. With the present invention, the encroachment is accommodated so as to allow for reduced lateral compactness in the power transfer unit. Specifically, the location of the ring gear 80 on the driven shaft 70 is such that the ring gear 80 extends to an area adjacent to that part of the stationary shaft 34 having a smaller diameter 50, the second part. Since the stationary shaft 34 does not require support bearings, additional area is freed up to accommodate and accept the ring gear 80 without requiring staggering or axial spacing thereof along the driven shaft 70. This results in the lateral compactness of the power transfer unit 10 being reduced.

The ring gear 80 is provided with teeth 82 which engage teeth 84 of a second bevel gear 86. The second bevel gear 86 is supported by one end of the output shaft 20. The second bevel gear may be supported by the output shaft 20 by conventional means including unitarily forming the bevel gear 86 with the output shaft 20 (as illustrated) or welding the bevel gear 86 to the output shaft 20. The output shaft 20 is supported within the housing 12 by bearings 88 enabling rotation of the shaft 20 about axis 90. As seen in FIG. 2, this second axis 90 of the non-parallel gear set 14 is generally oriented perpendicular to the axes 24, 76, 78 of the parallel gear set 16 and extends generally longitudinally with respect to the vehicle.

While not readily apparent in FIG. 2, the axes 76 and 90, about which the ring gear 80 and the second bevel gear 86 respectively rotate, may be such that the axes 76 and 90 intersect one another or do not intersect one another. In the later situation, which is preferred, the non-parallel gear set 16 is a hypoid bevel gear set.

Figure 3:
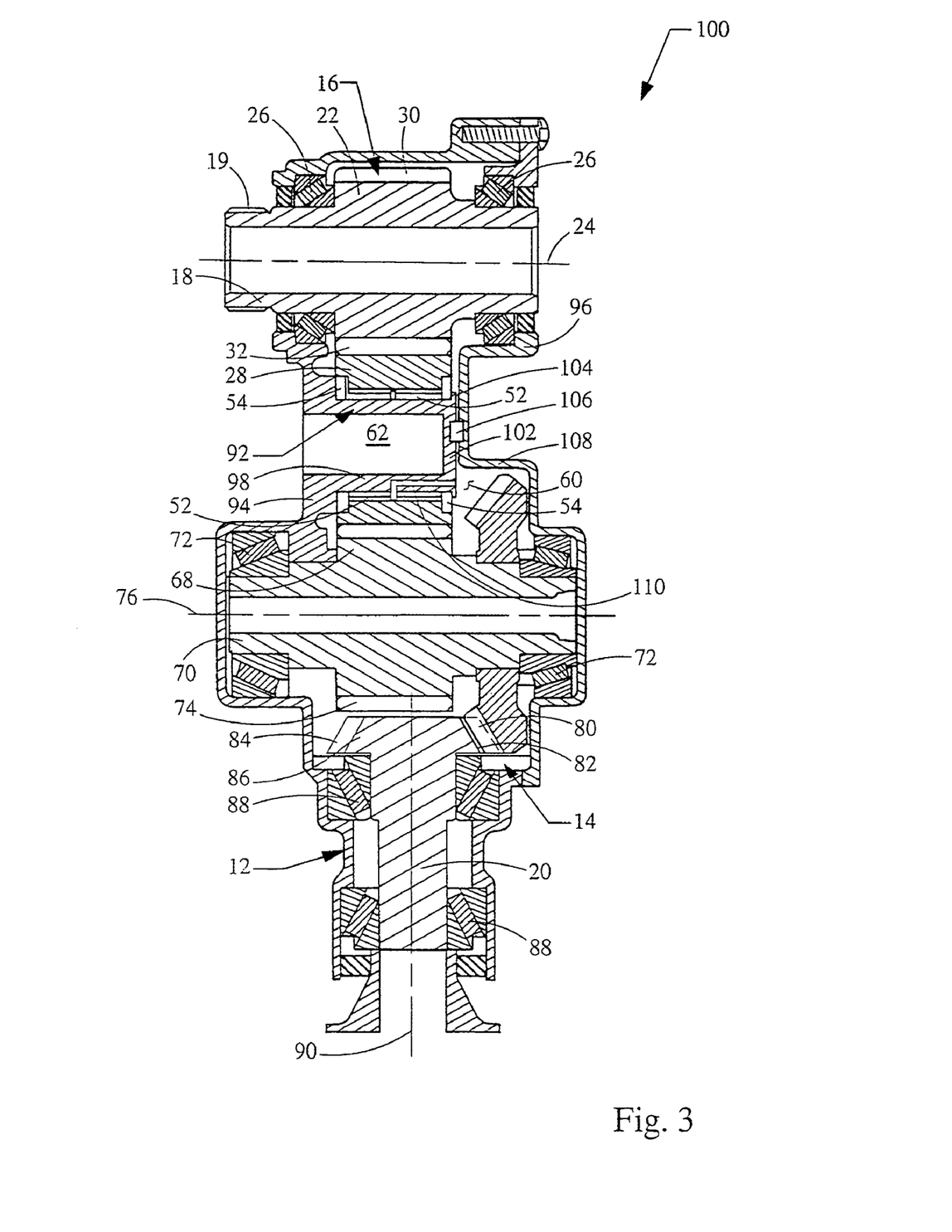
FIG. 3 is a cross section of a power transfer unit according to a second embodiment.

Referring now to FIG. 3, a second embodiment of a power transfer unit incorporating the principles of the present invention is generally illustrated therein and designated at 100. Since the power transfer unit 100 incorporates many of the components and features illustrated and described in connection with FIG. 2, common elements have been given like reference numerals. The difference between the first and second embodiments lies within the manner in which the idler gear 28 is supported in the power transfer unit. Accordingly, it is not believed that a detailed discussion regarding all of the common components of the power transfer unit from the prior embodiment is required in connection with the second embodiment. The reader's attention is therefore directed to the preceding of the detailed description in that regard. The discussion which follows will be limited to the manner in which the idler gear 28 is supported in this second embodiment.

Similar to the first embodiment, the idler gear 28 of the second embodiment is rotatably supported on a stationary member 92 extending through the idler gear 28. In the second embodiment, however, the stationary member 92 is a boss ("boss 92"). The boss 92 is unitarily formed with the housing 12 and extends from a first side 94 of the housing toward a second side 96 of the housing 12. The boss 92 is thus formed as an extension off of the first wall 94 and includes a cylindrical wall 98 terminating at a closed end 102. The exterior surface of the cylindrical wall 98 defines the bearing seat for the radial needle bearings 52. Axially, the idler gear 28 is supported by axial idler shafts 54, which, again, may be needle thrust bearings or simple trust washers. In order to locate and retain the idler gear on the boss 92, a shoulder 104 is formed about the outer periphery of the end wall 102. While the boss 92 should be sufficiently stable and rigid on its own, the boss 92 may be further stabilized and located relative to the second side 96 through the providing of an interlock 106 extending between the second side 96 of the housing and the end wall 102 of the boss 92 while the interlock 96 may take many forms, it may include, but is not limited to, means such as dowels and pins.

To further facilitate the lateral compactness of the power transfer unit 100, the end wall 102 of the boss 92 preferably terminates adjacent to the corresponding lateral end of the idler gear 28. The second side 96 of the housing is therefore formed with a recess 108 extending toward the interior of the power transfer unit 100 so as to be immediately adjacent to the end wall 102. The recess 108 is formed and located such that the ring gear 80 extends to a location adjacent thereto and which is laterally adjacent to at least a portion of the boss 92.

In order to provide lubrication to the radial needle bearings 52, the boss 92 is provided with at least one lubrication port 110. The lubrication port 110 includes a discharge opening in a radially exterior surface of the cylindrical wall 98, which is located such that it delivers lubrication to the annular space between the pair of radial needle bearings 52. The inlet opening of the lubrication port 110 is provided so as to extend through the end wall 102 of the boss 92 into the sump 60 of the power transfer unit. In this way lubricant can be entrained from the sump 60 to the radial needle bearings 52.

Figure 4:
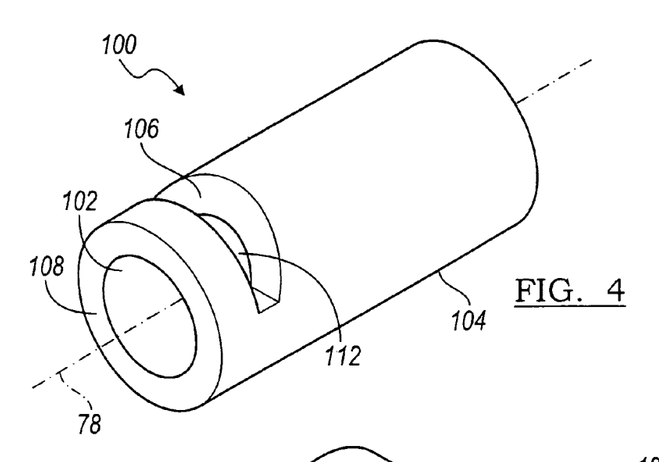
FIG. 4 is perspective view of an idler shaft having a uniform outer diameter and a local clearance space for a bevel ring gear.

Referring now to FIG. 4, idler shaft 100 is a hollow tube having an inner chamber 102 that extends its full axial length, and outer surface 104 having a uniform outside diameter that extends its entire axial length. Because of this configuration, idler shaft 100 is preferably formed from tube stock. Idler shaft 100 is supported at its the left end on the housing 12 at a journal seat 40' and at its right end on the housing at a journal seat 42', as shown in FIG. 7.

A clearance space 106, formed through the thickness of the tube wall 108, accommodates the radial outer portion of ring gear 80, which is secured to driven shaft 70, which rotates on bearing 72 fitted in the housing 12. The clearance space 106 extends axially a short distance along axis 78 and angularly less than 180 degrees about axis 78. The clearance space 106, which forms an opening 112 through the wall 108, communicates the outer surface 104 to the interior chamber 102.

Figure 8:
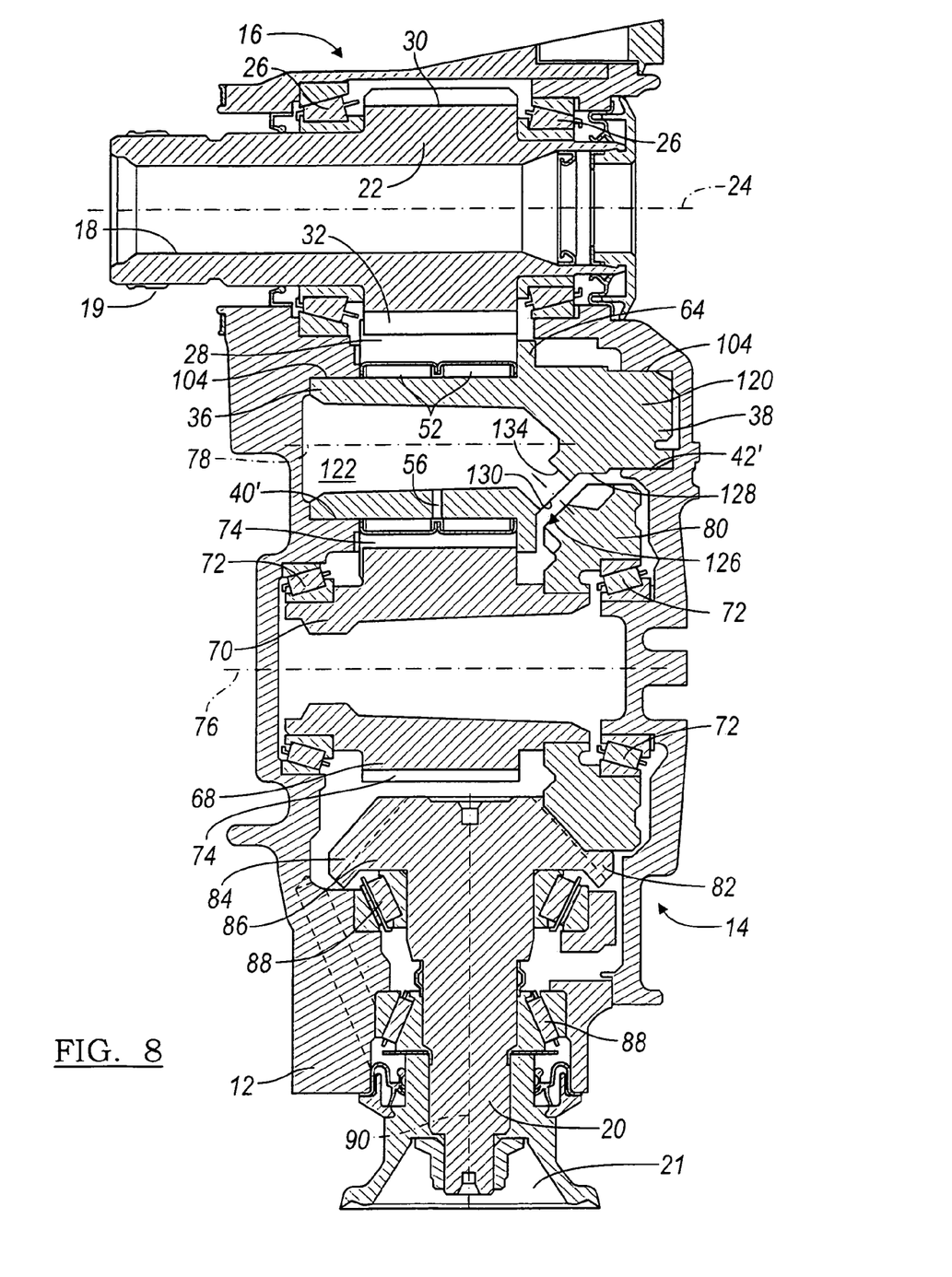
FIG. 8 is a cross section of a power transfer unit according to a third embodiment.

As FIG. 8 illustrates, bearings 52 are supported on the outer surface 104 of the idler shaft 100. The opening 112 in the idler shaft 100 is located and formed such that lubricant carried on the ring gear 80 as it rotates within the housing 12 is thrown radially outward by centrifugal force through the opening into the chamber 102. A radial lubricant passage 56, seen best in FIG. 8, carries hydraulic lubricant from chamber 102 to the outer surface 104, where the bearings 52 are located, lubricated, and cooled by lubricant flowing through passage 56.

Figures 5, 6:
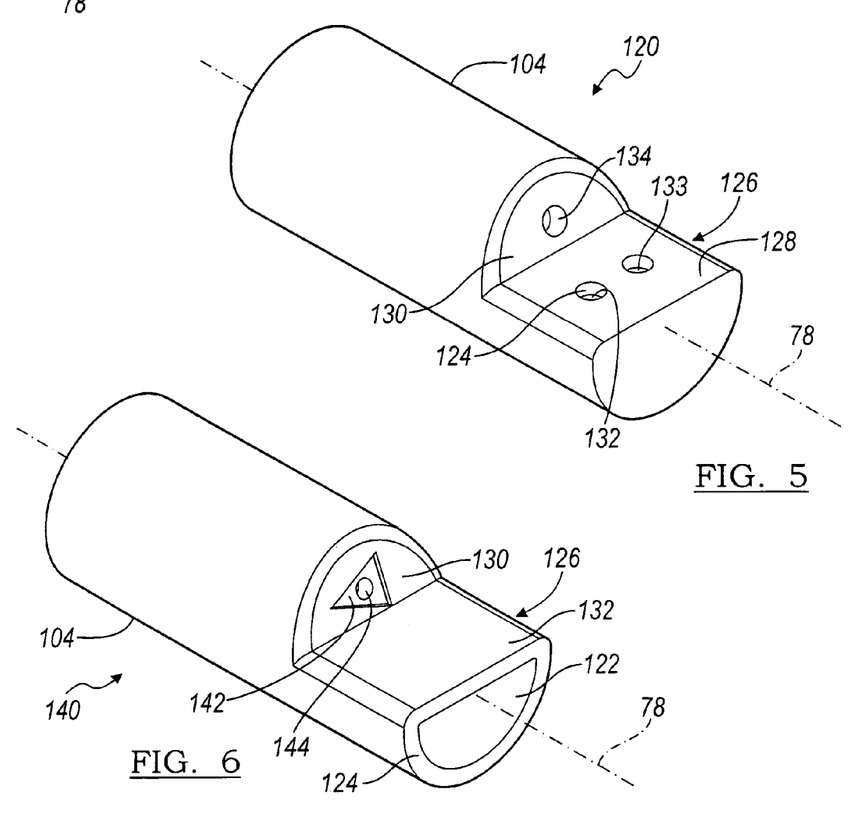
FIG. 5 is perspective view of an idler shaft having a uniform outer diameter and an alternate clearance space.
FIG. 6 is perspective view of the idler shaft of FIG. 5 with a lube supply passage.
Figure 7:
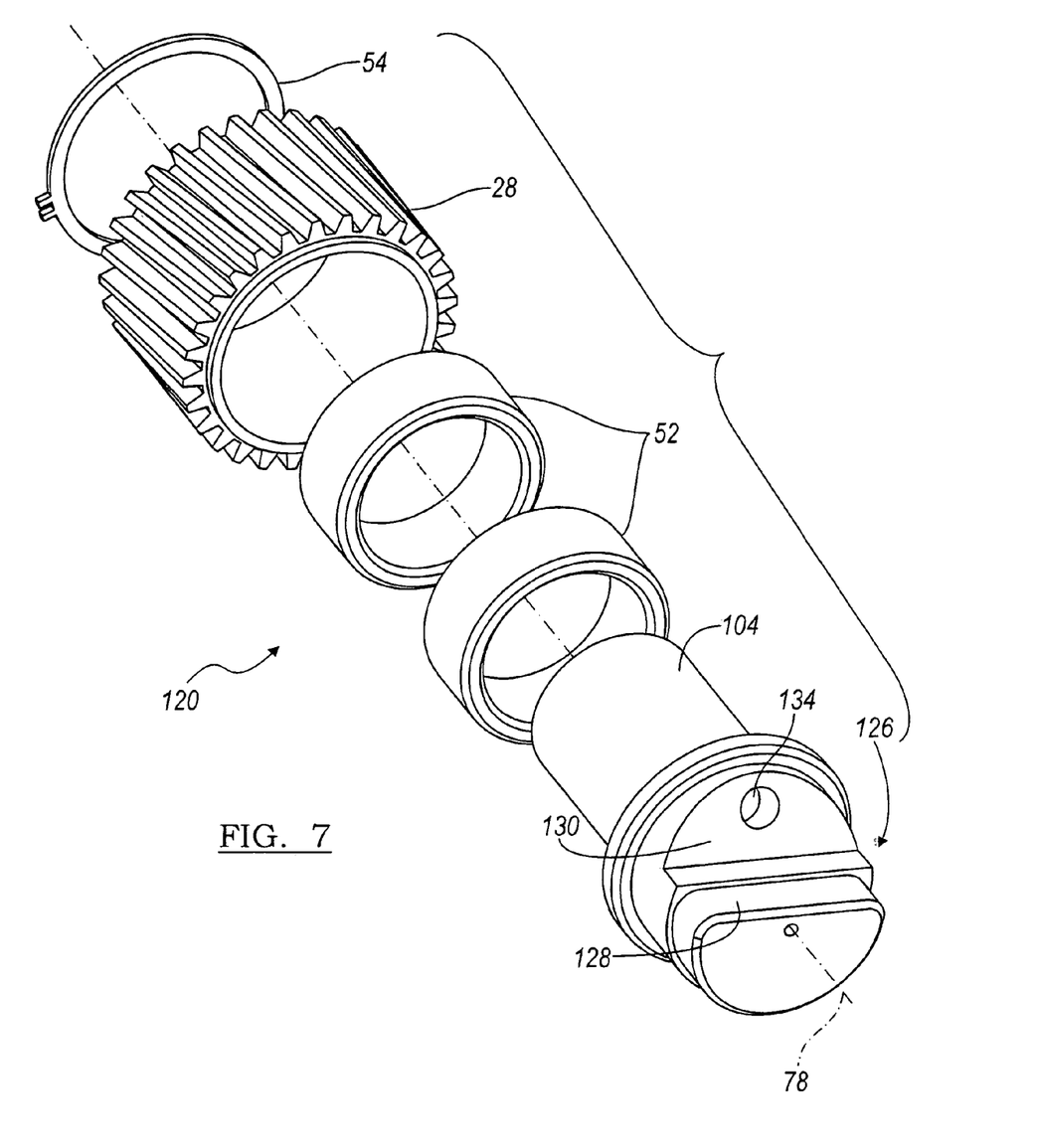
FIG. 7 is a perspective view of the idler subassembly including the idler shaft of FIG. 5, bearings and idler gear.

An alternate idler shaft 120, shown in FIGS. 5, 7 and 8, is preferably a machined forging having a uniform outside diameter, which extends along the full length of the shaft. Idler shaft 120 is supported at its left end on the housing 12 at a journal seat 40' and at its right end on the housing at a journal seat 42', as shown in FIG. 8.

Idler shaft 120 is also formed with an internal chamber 122, which extends at least partially along the length of the shaft and is bounded by the wall 124. A clearance space 126 is formed at the left hand side of shaft 120 when viewed as seen in FIG. 8. Clearance space 126 is formed by a planar surface 128 and an inclined surface 130, which extends radially outward and axially from the surface 128. Lubricant supply holes passages 132, 133, formed in surface 128 through the thickness of the wall 124, communicate the clearance space 126 to the chamber 122. Similarly, a lubricant supply passage 134, formed in surface 130 through the thickness of the wall 124, communicates the clearance space 126 to the chamber 122. Clearance space 126 is located such that lubricant carried on the ring gear 80 is thrown onto surfaces 128, 130 by centrifugal force as ring gear 80 rotates. The hydraulic lubricant on surfaces 128, 130 flows through the lubricant passages 132, 133, and 134 into chamber 122. The lubricant outlet passage 56 carries lubricant from chamber 122 to the bearings 52, located on the outer surface 104.

The alternate idler shaft 140 shown in FIG. 6 is similar to shaft 120 shown in FIG. 5, except that chamber 122 is open at the right end of the shaft and planar surface 132 is not formed with lubricant supply holes. Instead, inclined surface 130 is formed with a small depression or well 142 surrounding the lubricant supply passage 144 to facilitate flow of lubricant through passage 144 into chamber 122. The lubricant outlet passage 56 carries lubricant from chamber 122 to the bearings 52, located on the outer surface 104.

FIG. 7, a perspective view of the idler subassembly, shows idler shaft 120, idler gear 28, and bearings 52, which support the idler gear on the outer surface 104 of the idler shaft.

In accordance with the provisions of the patent statutes, the preferred embodiment has been described. However, it should be noted that the alternate embodiments can be practiced otherwise than as specifically illustrated and described.

What is claimed is:

1. A motor vehicle power transfer unit for distributing torque from a transmission assembly between a front wheel drive line and a rear wheel drive line, said power transfer unit comprising:
    a housing;
    a driving gear supported for rotation on the housing, a driven gear supported for rotation on the housing;
    an idler gear engaged with the driving gear;
    the driven gear engaged with the idler gear;
    a bevel ring gear secured to the driven gear for rotation therewith;
    a bevel gear supported for rotation on the housing and engaged with the ring gear; and
    an idler shaft secured to and supported on the housing, extending through the idler gear and supporting the idler gear for rotation thereon, the idler shaft including a chamber and a wall including an outer surface formed with a clearance space, into which clearance space a portion of the ring gear extends and rotates, said clearance space communicating through the wall with the chamber, the wall being formed with a first passage including a first end communicating with the chamber and a second end communicating with the first end and located at the outer surface.

2. The power transfer unit of claim 1, wherein the idler gear is supported on said idler shaft by bearings located on the outer surface adjacent the second end of the first passage.

3. The power transfer unit of claim 1, wherein the idler shaft includes:
    a first bearing supported on the outer surface and located at a first axial side of the second end of the first passage;
    second bearing supported on the outer surface and located at a second axial side of the second end opposite the first side, the idler gear being supported on the first and second bearings.

4. The power transfer unit of claim 1, wherein the idler shaft includes:
    a first needle bearing supported on the outer surface and located at a first axial side of the second end of the first passage;
    second needle bearing supported on the outer surface and located at a second axial side of the second end opposite the first side, the idler gear being supported on the first and second bearings.

5. The power transfer unit of claim 1, wherein the bevel ring gear is formed with hypoid gear teeth, and the bevel gear is formed with hypoid gear teeth meshing with the hypoid gear teeth of the bevel ring gear.

6. The power transfer unit of claim 1, wherein the idler shaft is journalled in the housing without bearings.

7. The power transfer unit of claim 1, wherein the clearance space communicates with the chamber through an opening in the wall, the opening extending axially along the idler shaft and angularly about an axis of the idler shaft.

8. The power transfer unit of claim 1, wherein the clearance space communicates with the chamber through a second passage formed in the outer surface of the wall.

9. The power transfer unit of claim 1, wherein the clearance space is at least partially bounded by a planar surface and an inclined surface that slopes axially and radially with respect to a longitudinal axis of the idler shaft, and the clearance space communicates with the chamber through a second passage formed in one of the inclined surface and the planar surface.

10. The power transfer unit of claim 1, wherein the clearance space is at least partially bounded by a planar surface and an inclined surface that slopes axially and radially with respect to a longitudinal axis of the idler shaft, and the clearance space communicates with the chamber through a second passage formed the inclined surface.

11. A motor vehicle power transfer unit for distributing torque from a transmission assembly between a front wheel drive line and a rear wheel drive line, said power transfer unit comprising:
   a housing;
   non-parallel gear set located in the housing and including a ring gear;
   a parallel gear set located in the housing, driveably coupled to the non-parallel gear set, including an idler, and an idler shaft having an outer surface of uniform external diameter at opposite axial ends where the idler shaft is secured to and supported on the housing, the idler shaft extending through the idler gear and supporting the idler gear for rotation thereon, including an interior chamber, and a wall, a portion of the outer surface being formed with a clearance space into which space a portion of the ring gear extends and rotates, said space communicating through the wall to the chamber, the wall being formed with a first passage that communicating the chamber to the outer surface.

12. The power transfer unit of claim 11, wherein the idler gear is supported on said idler shaft by bearings located on the outer surface adjacent an end of the first passage.

13. The power transfer unit of claim 11, wherein the idler shaft includes:
   a first bearing supported on the outer surface and located at a first axial side of an end of the first passage;
   second bearing supported on the outer surface and located at a second axial side of the second end opposite the first side, the idler gear being supported on the first and second bearings.

14. The power transfer unit of claim 13, wherein the first bearing is an needle bearing and second bearing is an needle bearing.

15. The power transfer unit of claim 11, wherein the idler shaft is journalled on the housing without bearings.

16. The power transfer unit of claim 11, wherein the clearance space communicates with the chamber through a second passage through the wall.

17. The power transfer unit of claim 11, wherein the clearance space communicates with the chamber through a second passage formed in the outer surface of the wall.

18. The power transfer unit of claim 11, wherein the clearance space is at least partially bounded by a planar surface and an inclined surface that slopes axially and radially with respect to a longitudinal axis of the idler shaft, and the clearance space communicates with the chamber through a second passage formed in one of the inclined surface and the planar surface.

19. The power transfer unit of claim 11, wherein the clearance space is at least partially bounded by a planar surface and an inclined surface that slopes axially and radially with respect to a longitudinal axis of the idler shaft, and the clearance space communicates with the chamber through a second passage formed in the inclined surface.

* * * * *